Dec. 8, 1953  N. M. REINERS  2,661,729
FUEL FEEDING APPARATUS
Filed June 2, 1948  6 Sheets-Sheet 1

INVENTOR.
Neville M. Reiners,
BY
Davis, Lindsey, Hibben & Noyes
Attys.

Dec. 8, 1953 N. M. REINERS 2,661,729
FUEL FEEDING APPARATUS
Filed June 2, 1948 6 Sheets-Sheet 6

INVENTOR.
Neville M. Reiners,
BY
Davis, Lindsey, Hibben + Noyes
Atty's.

Patented Dec. 8, 1953

2,661,729

UNITED STATES PATENT OFFICE 2,661,729

FUEL FEEDING APPARATUS

Neville M. Reiners, Columbus, Ind., assignor to Cummins Engine Company, Inc., Columbus, Ind., a corporation of Indiana Application June 2, 1948, Serial No. 30,549

10 Claims. (Cl. 123—139)

1

The invention relates to fuel feeding apparatus for internal combustion engines and more particularly to engines of the Cummins-diesel type.

The general object of the invention is to provide a novel fuel feeding apparatus of the foregoing character, adapted particularly for use with an engine having a large number of cylinders, such as a twelve-cylinder engine, and operating at a relatively high rotative speed, with the apparatus arranged to intermittently supply metered quantities of fuel to the respective engine cylinders.

More specifically, it is an object to provide a fuel feeding apparatus adapted for the use just mentioned and operating in a novel manner to overcome problems arising because of the high speed operation and the inertia of the fuel encountered at such speed.

Another object is to provide a novel fuel feeding apparatus for such use, in which fuel is supplied to the engine cylinders by a piston type metering pump, with the fuel supplied to the pump being taken from a constantly moving body of fuel under pressure to avoid difficulties in feeding the fuel due to the inertia thereof.

A further object is to provide a fuel feeding apparatus of the foregoing character, in which air in the passages leading to the metering pump or in the pump itself is prevented from being carried through to the cylinders of the engine.

Still another object is to provide a fuel feeding apparatus of the foregoing character, including a combined governor and manual control of novel construction.

A still further object is to provide in a fuel feeding apparatus of the foregoing character novel mechanism for operating an overspeed stop valve, which is automatically operable to prevent flow of fuel to the metering pump and is adapted to be manually reset.

It is also an object to provide a fuel feeding apparatus of the foregoing character, having a novel distributor for distributing fuel delivered by the metering pump to the respective engine cylinders.

Another object is to provide a novel manual control in a fuel feed apparatus of the foregoing character, which may be actuated manually to adjust the engine speed up to the maximum or to stop the engine and is automatically returned to an idle speed position when released.

Other objects and advantages will become apparent from the following description taken in connection with the accompanying drawings, in which:

2

Fig. 14 is a diagrammatic view of the entire fuel feeding apparatus.

A fuel feeding apparatus embodying the features of the invention is adapted to feed fuel to the cylinders of a multi-cylinder internal combustion engine, particularly of the Cummins-diesel type. While, in the drawings, I have shown a fuel feeding apparatus adapted for use with a twelve-cylinder engine of this character, the invention, of course, is not limited to this particular number of cylinders. However, the apparatus disclosed herein is particularly suited for an engine having a large number of cylinders, such as a twelve-cylinder engine, and operating at a relatively high rotative speed, as will be more fully explained hereinafter. The form of the apparatus shown in the drawings is for use with a four-cycle engine, but it will be apparent that it may be readily adapted for use with a two-cycle engine of the foregoing general character.

General description of the apparatus

In the preferred construction, the apparatus is arranged so that it may be mounted on the side of the engine in order that it may be driven thereby and thus establish a timed relation between the operation of the parts of the apparatus with the operation of the engine itself. The apparatus is enclosed in a housing structure comprising a pair of housing members, one superimposed upon the other. In the drawings, the lower housing member is indicated at 20 (see Figs. 2 and 3) while the upper housing member is indicated at 21. Suspended from the lower housing member 20 is a charging unit, indicated generally at 22.

Journaled in the lower housing member 20 is a main drive shaft 23 projecting beyond one end of the housing member 20 and having a driving connection with the engine, which is here shown in the form of a coupling member 24, so that the parts of the apparatus are driven in proper timed relation to the operation of the engine. The coupling member 24 is adapted to engage with another coupling member (not shown) driven by the engine. In the present instance, the ratio is such that the main drive shaft 23 is operated at the same speed as the crankshaft of the engine, for reasons which will more fully hereinafter appear. On the other end of the main drive shaft 23 is secured an extension 25, the outer end of which is accessible exteriorly of the housing and is adapted for connection with a tachometer (not shown).

Generally described, the present apparatus comprises the charging unit 22 which draws fuel from a fuel tank 26 (see Fig. 14) and supplies such fuel to a variable delivery metering pump, indicated generally at 27. The metering pump 27 is of the piston and cylinder constant-stroke type, and its output is controlled by bleeding off a predetermined portion of the fuel delivered on each stroke. The fuel delivered by the metering pump is conducted to a distributor, indicated generally at 30, which functions to deliver the fuel to the fuel injectors for the respective engine cylinders.

The quantity of fuel bled from the metering pump on each delivery stroke thereof, and consequently the quantity of fuel delivered to the distributor, is controlled both by a governor and a manual control for any desired engine speed. Control of the engine may also be exercised by an overspeed stop device, indicated generally at 31 in Figs. 4 and 14. The overspeed stop device is operated automatically as a result of an excessive engine speed, and serves to cut off the supply of fuel to the engine when the device is operated. Resetting of the overspeed stop device is accomplished manually.

In an engine of this type, where a relatively large number of cylinders are employed and where the rotative speed of the engine is fairly high, the number of metered charges of fuel per unit of time delivered by the metering pump 27 is large. Thus, for a twelve-cylinder, four-cycle engine operating at 1200 R. P. M., the number of individual charges of fuel delivered per minute by the metering pump is 7200. Since the metering pump is of the piston and cylinder type, this speed of operation involves stopping and starting movement of the fuel 7200 times per minute. It is obvious from these figures that the inertia of the fuel becomes a factor in effecting proper feeding of the fuel through the various parts of the apparatus. Since equal quantities of fuel must be delivered to the respective cylinders for proper operation of an engine at any desired speed, the problems involved in providing suitable apparatus become apparent.

In the present fuel feeding apparatus adapted for operation under the foregoing conditions, the fuel is so handled as to eliminate the difficulties due to the inertia involved in instituting movement and stopping such movement of the fuel. To this end, the fuel is supplied to the metering pump from a continuously moving body of fuel, so related to the metering pump that when the latter is ready to receive fuel on its intake stroke, a portion of the continuously moving body is merely diverted into the metering pump. In the pump itself and in the passages leading to it and from it, the fuel may be said to have a unidirectional flow, thus eliminating the necessity of reversing the direction of the flow at different points in the cycle of the pump. The fuel at all times is also maintained under suitable pressures, so that there is a rapid response to the opening of any port and fuel will immediately pass through such port. The result of such an arrangement is to attain accurate feeding of metered quantities of fuel even under the extreme conditions noted.

Fuel pumping means

Figure 2:
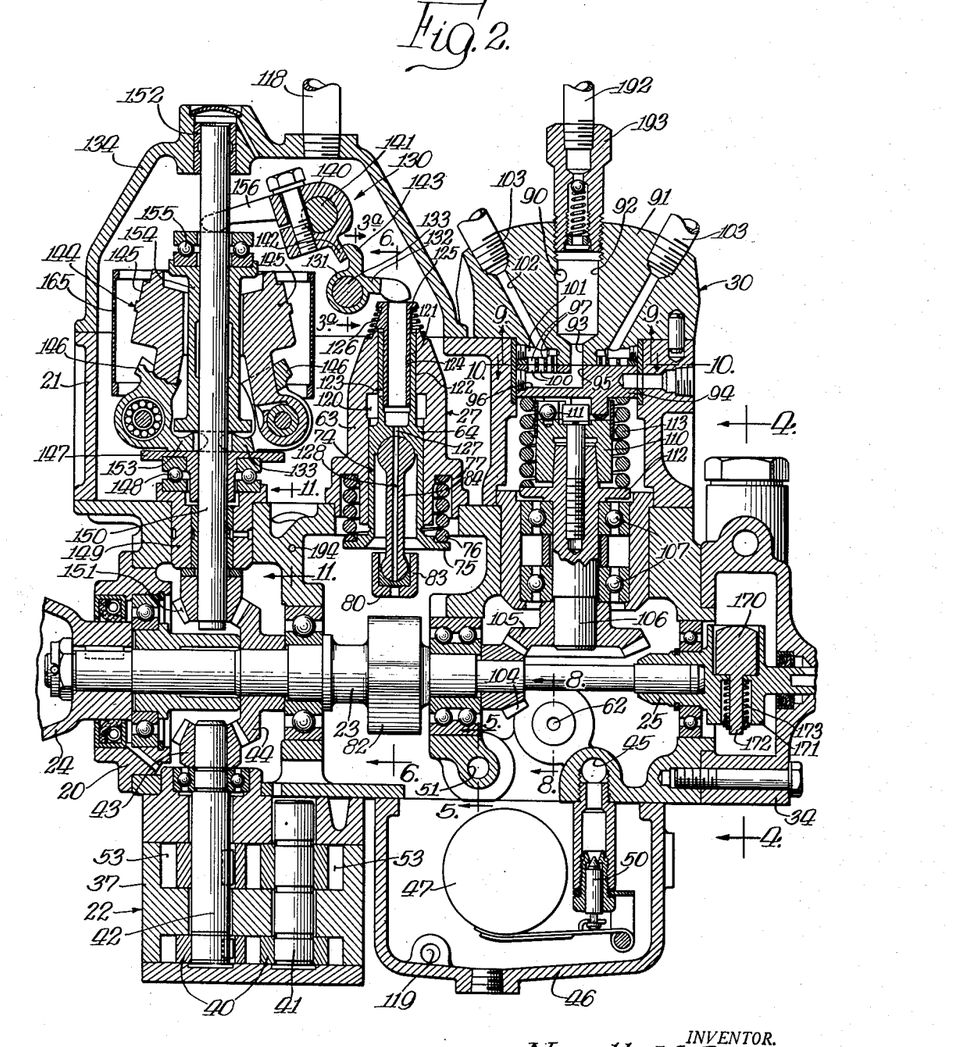
Fig. 2 is a vertical sectional view taken on the line 2—2 of Fig. 1.

The fuel charging unit 22, as heretofore mentioned, is adapted to draw fuel from the fuel tank 26 and comprises low and high pressure pumps, which may be of the gear type. Thus, as shown in Figs. 2 and 14, fuel is drawn from the tank 26 through a line 32, the latter being connected to a T fitting 33 (see Fig. 4) mounted in the lower face of an auxiliary housing member 34 secured to the right-hand end of the lower housing member 20 as shown in Fig. 2. The fuel entering through the T fitting 33 passes through a check valve 35 to which the T fitting 33 is secured, and enters a passage 36 extending longitudinally in the lower part of the lower housing member 20. The passage 36 connects with a pump body 37 suspended from the lower housing member 20, in which is located a pair of gears 40 comprising the low pressure or transfer pump. One of the gears 40 is mounted on an idler shaft 41 (see Figs. 2 and 14), while the other gear 40 is mounted on a drive shaft 42 extending upwardly from the pump housing 37 and into the lower housing member 20. At its upper end, the shaft 42 is provided with a bevel pinion 43 meshing with a bevel gear 44 mounted on the main drive shaft 23 of the apparatus.

Figure 5:
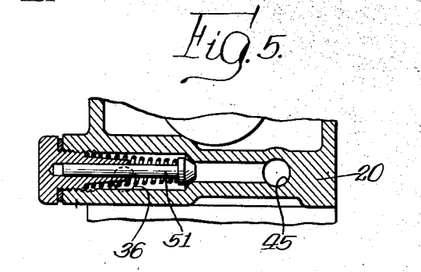
Fig. 5 is a fragmentary transverse sectional view taken on the line 5—5 of Fig. 2.

Fuel delivered by the low pressure gear pump 40 is conducted through a passage 45 formed in the lower housing member 20 and leading to a float chamber 46 suspended from the lower housing member 20. The level of fuel within the float chamber 46 is controlled by a float 47 which operates a float valve 50 controlling the flow of fuel from the low pressure pump 40 through the passage 45. The parts are so arranged that when the level of fuel within the float chamber 46 reaches a predetermined level, the valve 50 is closed to stop the flow of fuel from the low pressure pump. The low pressure pump, however, continues to operate and a spring-operated by-pass valve 51 (see Figs. 5 and 14) is provided to permit the discharge of fuel from the low pressure pump 40 to return to the intake or suction side thereof without passing into the float chamber 46. The valve 51, as is evident from an inspection of Fig. 5, thus permits the fuel to pass from the discharge passage 45 of the low pressure pump back to the intake passage 36 thereof.

Figure 8:
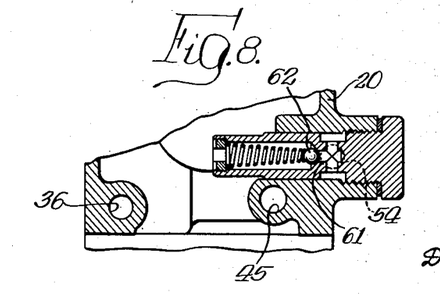
Fig. 8 is a transverse sectional view taken on the line 8—8 of Fig. 2.
Figure 12:
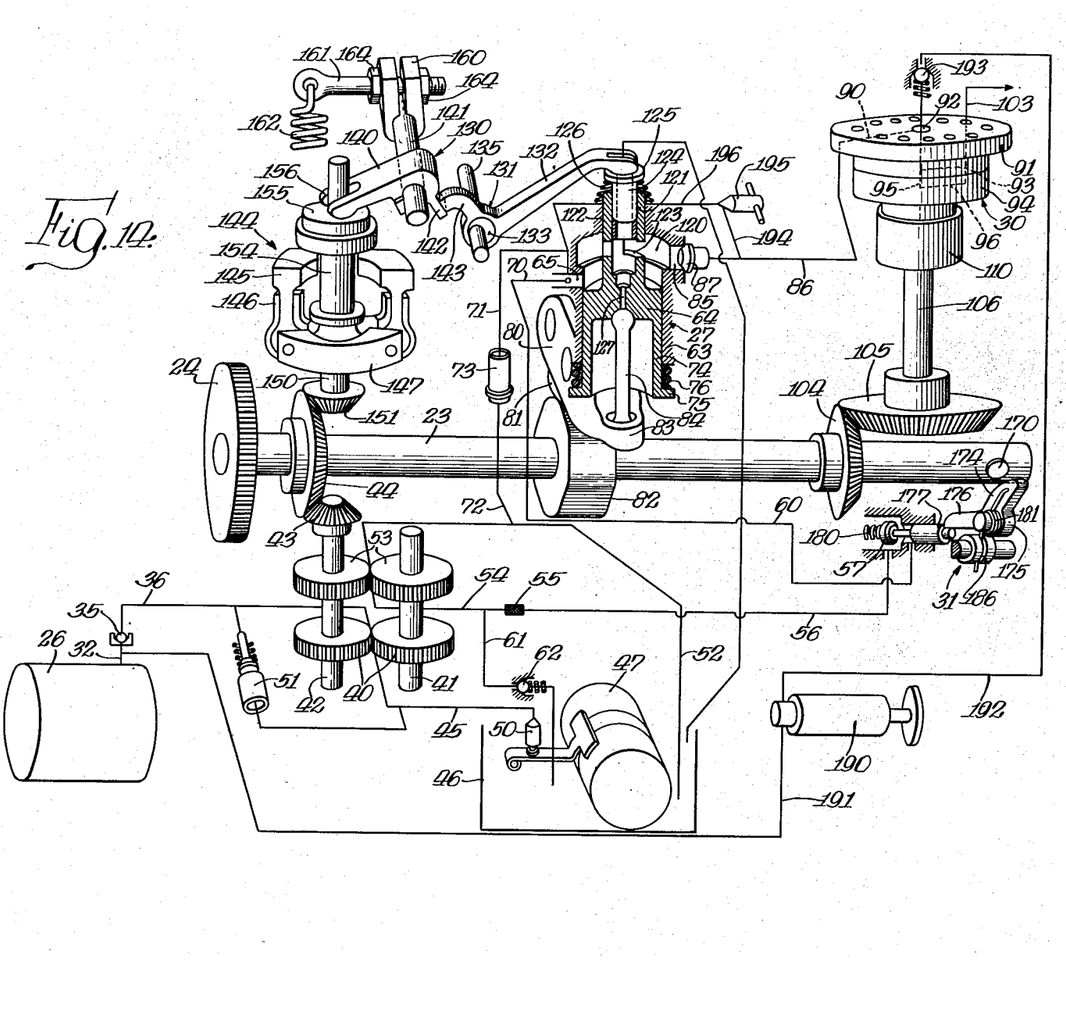
Figure 15:
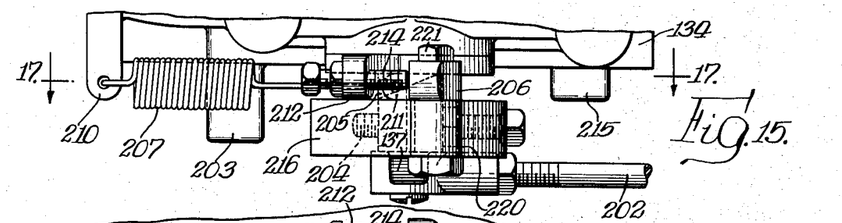
Fig. 15 is a fragmentary plan view showing the manual control for the apparatus.

Fuel from the float chamber 46 is withdrawn through a passage 52 in the lower housing member 20 by the high pressure gear pump comprising gears 53 located in the pump housing 37 and mounted on the shafts 41 and 42. The discharge from the high pressure gear pump 53 is conducted by a passage 54 formed in the lower housing member 20 through a filter 55 located in the auxiliary housing member 34. From the filter 55, there extends a passage 56 leading to an overspeed stop valve 57 mounted in the auxiliary housing member 34 and more fully described hereinafter. From the overspeed stop valve 57, the fuel is conducted through a passage 60 to the metering pump 27. When the overspeed stop valve 57 is closed, the fuel discharged by the high pressure pump 53 is permitted to pass through a by-pass passage 61 branching from the discharge passage 54 and leading to a spring-pressed pressure-operated valve 62 (see Figs. 2, 8 and 14). The fuel discharged through the valve 62 passes out through the end thereof into the interior of the lower housing member 20 to drain downwardly into the float tank 46.

Figure 6:
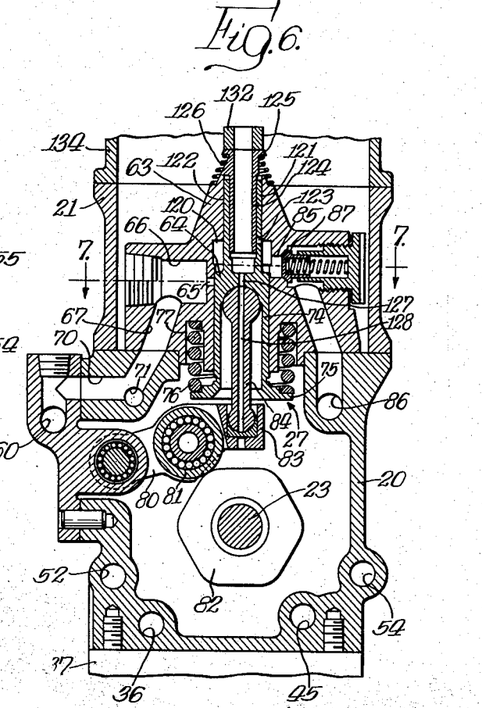
Fig. 6 is a fragmentary transverse sectional view taken on the line 6—6 of Fig. 2.
Figure 7:
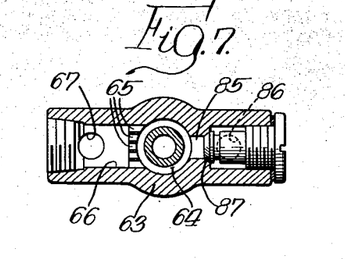
Fig. 7 is a fragmentary horizontal sectional view taken on the line 7—7 of Fig. 6.

As heretofore mentioned, the fuel metering pump 27 is of the piston and cylinder type. Thus, it comprises a cylinder casing 63 in which is mounted the piston indicated at 64 (see Figs. 2, 6 and 14). The cylinder casing 63 preferably constitutes a separate part rigidly mounted on the upper face of the lower housing member 20 within the upper housing member 21. The cylinder casing 63 is provided with an intake port comprising a plurality of apertures 65 (see Fig. 7) located at one side of the cylinder intermediate the ends thereof and extending from a chamber 66 provided in the pump casing 63. Leading to the chamber 66 in the pump casing 63 is a passage 67 extending downwardly therefrom and communicating with an angularly shaped passage 70 formed in the lower housing member 20. The angularly shaped passage 70 in turn communicates with the passage 60 through which the discharge from the high pressure gear pump 53 flows. The intake ports 65 are controlled by the reciprocation of the piston 64 and thus are opened and closed by the movement of the piston.

Since the reciprocation of the piston involves intermittent movement of fuel into the cylinder of the metering pump, initiation of movement of the body of fuel available for admission to the pump is required, in the usual apparatus, each time the intake port opens, and stopping of such movement is required each time the intake port closes. Because of the rapidity with which the fuel must be moved, the inertia of the fuel incurred during such starting and stopping might result in cavitation occurring in the cylinder, so that a full charge of fuel would not be delivered to the metering pump. This, of course, would result in diminished quantities of fuel delivered to the respective engine cylinders.

To avoid this difficulty, the fuel discharged by the high pressure gear pump is kept in a continuously flowing condition under pressure adjacent the intake port 65 so that a mere diversion of a portion of this continuous flow will bring the fuel into the metering pump. To this end, the passage 60 is connected through the angular passage 70 with a passage 71 leading to the intake passage 52 for the high pressure gear pump 53. The passage 71 extends longitudinally of the lower housing member 20 in the upper part thereof and connects with the passage 52 through a downwardly extending passage 72 (see Fig. 3) provided in the lower housing unit 20 adjacent the left end thereof. The high pressure gear pump 53 thus continuously circulates fuel through the passages 60, 70 and 71 adjacent the intake ports 65. Such fuel is maintained under pressure by means of a spring-pressed pressure control valve 73 located in the passage 72. Thus, when the piston 64 opens the intake ports 65, fuel is immediately diverted from the continuously flowing body of fuel in the angular passage 70 so that it passes through the passage 67 in the pump casing 63, the chamber 66 and into the cylinder of the pump through the intake ports 65.

The piston 64 is provided with a downwardly extending skirt portion 74 (see Figs. 2, 6 and 14), the lower end of which has an outwardly extending flange 75. To move the piston 64 downwardly, a coiled spring 76 bears at one end against the flange 75 and its other end is seated in an annular groove 77 formed in the cylinder casing 63. The spring 76 thus functions to cause the suction stroke of the piston 64. The piston 64 is actuated on its delivery stroke by means of the drive shaft 23. To this end, a lever 80 is pivotally supported in the housing and, intermediate its ends, is provided with a roller 81 adapted to engage a cam 82 provided on the driveshaft 23. The free end of the lever 80 is cup-shaped, as indicated at 83, to receive the lower end of a thrust link 84, the upper end of which bears against the piston 64. The thrust link 84 is preferably provided with ball-shaped ends adapted to bear in similarly shaped sockets respectively provided in the cup-shaped end 83 of the lever 80 and in the piston 64.

The piston 64 is thus actuated by the cam 82 in timed relation to the operation of the engine. In the present instance, with the main shaft 23 driven at the same speed as the engine, and the engine being of the four-cycle type, the cam 82 is provided with six lobes to operate the pump six times for each revolution of the engine. Fuel will thus be delivered by the metering pump to six cylinders of the engine during each revolution thereof, which is the proper number for a twelve-cylinder four-cycle engine.

The metering pump 27 is provided with a delivery port, indicated at 85, which is so located relative to the intake ports 65 that the fuel in moving through the pump has a unidirectional flow. Thus, the delivery port 85 is located diametrically opposite the intake ports 65, but at a different level, for reasons hereinafter explained. This construction avoids the necessity of reversing the direction of flow of fuel on each stroke of the pump, as has hereinbefore been the case in other pumps of this character where a single port provides for both intake and delivery therethrough. This is another feature in the present construction which makes the present apparatus particularly adapted for high-speed operation.

The delivery port 85 communicates with the distributor 30 through a passage 86 (see Figs. 6 and 14) formed in the lower housing member 20. To prevent back flow from the distributor, a spring-pressed pressure-operated valve 87 is mounted in the cylinder casing 63 adjacent the delivery port 85, and therefore the fuel delivered by the metering pump must be raised to a predetermined pressure before it can enter the passage 86.

The passage 86 communicates with a passage 90 (see Figs. 2 and 14) formed in a stationary disc 91 constituting a part of the distributor 30. The disc 91, as will be noted in Fig. 2, is mounted on the upper face of the upper housing member 21 and has a lower central portion projecting into the housing member. The passage 90 in the stationary disc member 91 opens into a chamber 92 positioned axially in the stationary disc member 91 and having a central aperture 93 in the lower face of the stationary disc member 91.

The stationary disc member 91 cooperates with a rotatably driven disc member 94 located within the upper housing member 21 to distribute the fuel supplied thereto by the metering pump to the respective engine cylinders. To this end, the rotatably driven disc 94 is in face-to-face engagement with the bottom face of the stationary disc 91 and is provided with a central aperture 95 aligned with the aperture 93 in the stationary disc 91 to receive the measured quantities of fuel therethrough as delivered by the metering pump. The rotatably driven disc 94 has a radial passage 96 (see Figs. 2, 10 and 14) extending from the aperture 95. The radial passage 96 is provided with an opening in the face of the disc 94 adapted to be sequentially moved into registry with openings in the lower face of the stationary disc member 91 and connected to the injectors for the respective engine cylinders.

Figures 3, 9, 10, 11:
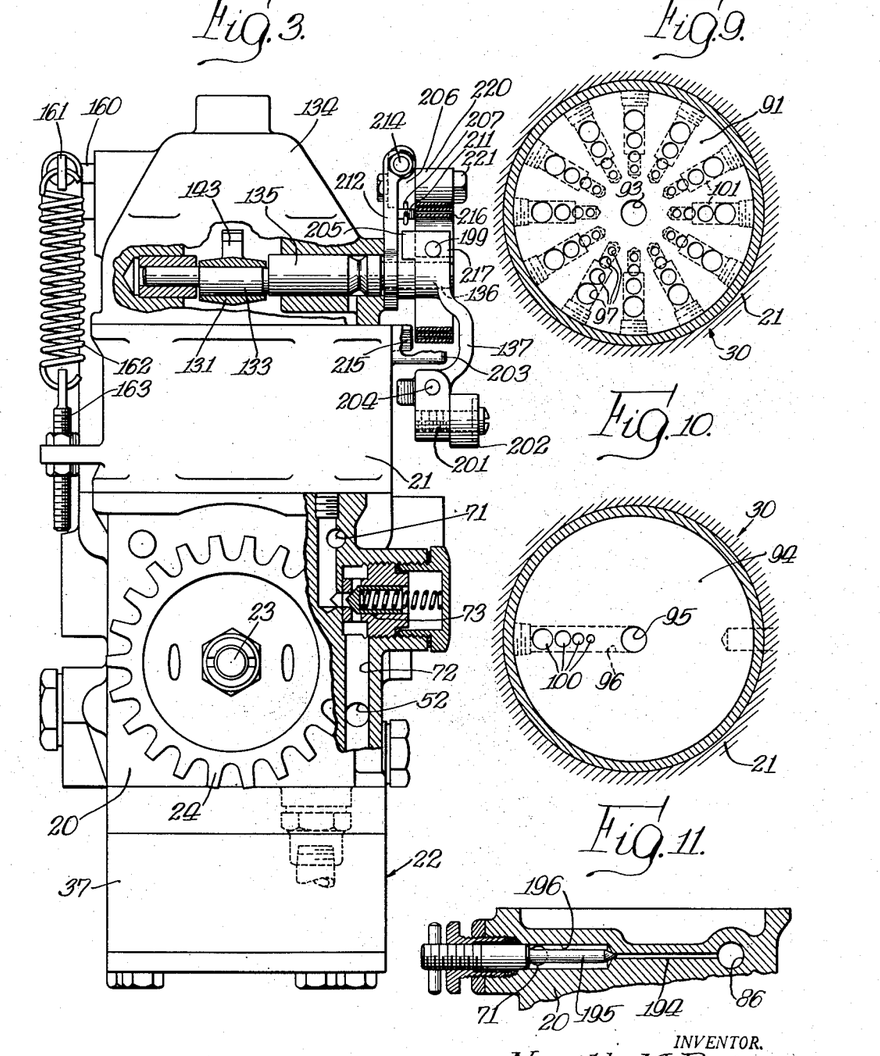
Fig. 3 is an end elevational view of the left end of the apparatus as shown in Fig. 1, the sectional portion in the lower part of this figure being taken on the line 3—3 of Fig. 1, and the sectional portion in the upper part of this figure being taken on the line 3a—3a of Fig. 2.
Fig. 9 is a horizontal sectional view taken on the line 9—9 of Fig. 2.
Fig. 10 is a horizontal sectional view taken on the line 10—10 of Fig. 2, the lines 9—9 and 10—10 being the same but the respective views being taken in opposite directions.
Fig. 11 is a fragmentary transverse sectional view taken on the line 11—11 of Fig. 2.

Since the present distributor is arranged for use in connection with a twelve-cylinder engine, the openings in the stationary disc member 91 have to be rather closely spaced circumferentially of the disc. However, because of the rapidity with which the fuel has to be transferred from the rotary disc member 94 to the stationary disc 91, the flow through the openings must be free. For this reason, each opening in the bottom face of the stationary disc member comprises a radially positioned set of apertures 97, with the apertures increasing in size the farther they are from the center of the disc member, as shown in Fig. 9. Correspondingly, the opening from the radial passage 96 in the rotatably driven disc member 94 comprises a similar set of apertures 100, as shown in Fig. 10. The fuel thus is readily transferred from the rotary disc member 94 to the stationary disc member 91 without any great resistance to the flow from one disc member to the other. The rotation of the disc member 94, of course, moves the apertures 100 successively into registration with the apertures 97 in the stationary disc member to distribute the fuel to the respective cylinders.

Figures 1, 12, 13:
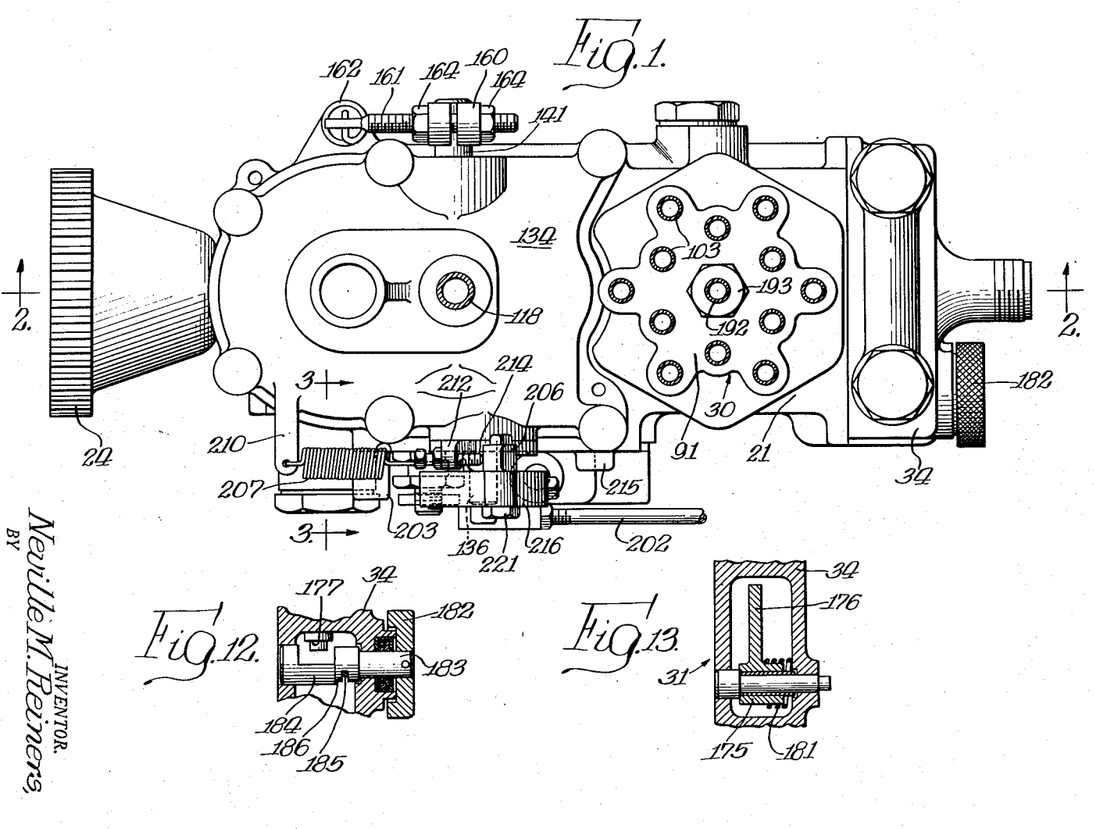
Figure 1 is a plan view of a fuel feeding apparatus embodying the features of the invention.
Fig. 12 is a fragmentary vertical sectional view taken on the line 12—12 of Fig. 4.
Fig. 13 is a fragmentary vertical sectional view taken on the line 13—13 of Fig. 4.

Each set of apertures 97 opens into a radial passage 101 in the stationary disc member 91, and the passage 101 communicates with an angularly positioned passage 102 extending toward the top of the stationary disc member 91. In the upper end of each passage 102 is mounted a tube or pipe 103 connected to one of the engine cylinder injectors (not shown). To permit the tubes 103 to be arranged within a relatively small space, the passages 102 alternately extend at slightly different angles to the top face of the stationary disc member 91 so that the tubes 103 are in radially staggered relation, as illustrated in Fig. 1.

To drive the rotary disc member 94, the main shaft 23 is provided with a bevel pinion 104 (see Figs. 2 and 14) meshing with a bevel gear 105 mounted on the lower end of a stub shaft 106. The stub shaft 106 is journaled in the lower housing member 20 by means of antifriction bearings 107 and has a driving connection with a cap member 110 secured on its upper end. The cap member 110 constitutes the driving member of a ball clutch device 111, the other member of which constitutes the rotary disc member 94. The ball clutch device 111 thus rotatably drives the rotary disc member 94 but permits the disc member to properly bear in accurate face-to-face engagement with the stationary disc member 91.

To hold the two disc members in face-to-face engagement with each other, the stub shaft 106, adjacent its upper end, is provided with a flange 112, on which is seated a coiled spring 113. The upper end of the coiled spring 113 bears against the lower face of the rotary disc member 94 to hold it in engagement with the stationary disc member 91. The rotary disc member 94, since it is driven by the main drive shaft 23, is thus operated in timed relation with the engine. The gear ratio between the pinion 104 and the bevel gear 105 is such that the stub shaft 106 rotates at one half the speed of the main drive shaft 23 so that the apertures 100 in the rotary disc member 94 register with each set of apertures 97 in the stationary disc member 91 once for each two revolutions of the engine crankshaft, and fuel is thus distributed to each cylinder once during each two revolutions of the engine.

*Control of the fuel delivered by the metering pump 27*

In order to control the speed of operation of the engine, the quantity of fuel delivered to the distributor 30 by the fuel metering pump 27 on each delivery stroke thereof is varied. In the present instance, such variation in the metered quantities of fuel is accomplished by bleeding off a portion of the fuel from the metering pump on each delivery stroke thereof, the stroke of the pump being constant. By varying the amount of fuel bled off during the delivery strokes, the amount of fuel delivered to the engine cylinders may thus be varied. In the present instance, the means for bleeding off the fuel is of a novel character, which is simple in construction and provides for accurate adjustment of the quantity of fuel delivered to each cylinder. In the structure shown in the drawings, the interior of the cylinder casing 63 is enlarged at its upper end, as shown at 120 (see Figs. 2, 6 and 14). The piston 64 operates in the main portion of the cylinder casing 63 but has a reduced tubular extension 121 at its upper end extending through the enlarged portion 120 of the cylinder and into a bore 122 in the upper end of the cylinder casing. The main body of the piston 64 thus functions as a pumping portion, while the extension 121 constitutes part of the fuel bleeding control. The extension 121 is provided with a lateral aperture 123 spaced above the end of the piston proper. Located within the extension 121 is a tubular control member 124 in telescopic relation with the extension 121.

The lateral aperture 123 in the extension 121 and the lower end of the tubular control member 124 are so located that, at the start of the upward or delivery stroke of the piston 64, the lateral aperture 123 is below the end of the tubular control member 124. Fuel from the cylinder may thus be forced through the lateral aperture 123 and thence outwardly through the interior of the tubular control member 124 into the housing structure. As the piston continues its upward movement, the lateral aperture 123 passes over the lower end of the tubular control member 124 to prevent flow therethrough. The fuel remaining in the cylinder at this point in the cycle is then placed under pressure by continued movement of the piston 64, so that the pressure-operated valve 87 is forced open and the fuel under such pressure is delivered to the distributor 30 through the passage 86. The position of the lateral aperture 123 in its relation to the lower end of the tubular control member 124 is such that closing of the aperture 123 does not occur until after the piston has moved sufficiently to close the intake ports 65. The delivery port 85 is located in the enlarged portion 120 of the cylinder so that the only place that the fuel can escape after the lateral aperture 123 is closed is through the delivery port 85 and the pressure-operated valve 87.

When the piston 64 is at the lower end of its stroke, the continuously flowing fuel in the passage 70 is diverted into the cylinder through the intake ports 65 and, since the lateral opening 123 is open at this point in the cycle, air in the cylinder will be forced out through the tubular control member 124 by the inrushing fuel. The valve 87 is set to open at a higher pressure than that attained in the cylinder by the inrushing fuel, and the valve 73 is so set as to divert sufficient fuel into the cylinder without opening the valve 87. Any air remaining in the cylinder after the intake ports 65 are closed, to a great extent will be forced out through the tubular control member 124 by the upward movement of the piston, and any air remaining in the cylinder will not be forced through the valve 87. Air is thus prevented from being carried over into the distributor and from there into the cylinders of the engine. The foregoing arrangement of parts thus provides for bleeding a portion of the fuel in the metering pump on each delivery stroke of the piston, such portion being bled off during the initial movement of the piston. The fuel bled off through the member 124 is permitted to fill the upper housing and to pass through a tube 118 (see Fig. 2) connected to the top of the housing and extending to the float chamber 46 for connection therewith in an opening 119.

To provide for lubrication of the bearing surfaces of the thrust link 84 with the sockets in the piston 64 and cup-shaped end 83 of the lever 80, the piston 64 is provided with a small central passage 127 (see Figs. 2 and 6) communicating with a longitudinal passage 128 extending through the thrust link 84. A portion of the fuel bled from the cylinder through the lateral opening 123 thus may pass through the passages 127 and 128 for access to the bearing surfaces of the thrust link 84.

To control the quantity of fuel bled off during each delivery stroke of the piston, the tubular control member 124 is adjustable axially so as to determine the point in the stroke at which the lateral opening 123 passes over the end of the tubular control member 124. To this end, the tubular control member 124, at its upper end, is provided with a flange 125. Bearing against the flange 125 is a coiled spring 126 seated on the upper end of the cylinder casing 63 and tending to move the tubular control member 124 upwardly. Mounted within the upper housing member 21 is a control linkage, indicated generally at 130 (see Figs. 2 and 14) for forcing the tubular control member 24 downwardly.

Engine control linkage

The control linkage 130 is such that it may be either manually operated or automatically operated by an engine-driven governor to vary the amount of fuel delivered on each stroke of the metering pump 27 and thus control the speed of operation of the engine. In the present instance, the control linkage 130 comprises a bell crank 131 (see Figs. 2 and 14) having one of its arms 132 bearing on the upper end of the tubular control member 124 to force it downward against the pressure of the spring 126. The bell crank 131 is pivotally supported by means of an eccentric 133 (see Figs. 3 and 14) formed on a shaft 135, with the latter journaled in a cover structure 134 secured to the upper housing member 21. The shaft 135 extends externally of the cover structure 134, as at 136, and on the outer end 136 is mounted a hand control lever 137. By swinging the hand lever 137, the eccentric 133 is thereby rotated to swing the bell crank 131 so that its arm 132 varies the position of the tubular control member 124. The amount of fuel bled off on each delivery stroke of the metering pump 27 may thus be manually controlled.

When the manual control is set for idling speed, an engine-driven governor holds the engine at such speed, and when the manual control is set for any higher speed, the governor assumes control when the engine exceeds a predetermined speed. Thus, the control linkage 130 includes a lever 140 carried on a rockshaft 141 journaled in the cover structure 134. The lever 140 is provided with an outwardly extending lug 142 engaging the second arm of the bell crank, indicated at 143. The lever 140 is adapted to be actuated by a governor, indicated generally at 144, and mounted in the upper housing member 21. In the present instance, the governor comprises a pair of low-speed weights 145 and a pair of high-speed weights 146. Both pairs of weights are mounted on a carrier 147 rigidly secured to a vertical shaft 150 extending downwardly into the lower housing member 20. The carrier 147 rests on a thrust bearing 148 carried on a member 149 carrying a bushing supporting the shaft 150. The lower end of the shaft 150 carries a bevel gear 151 meshing with the bevel gear 44 on the main drive shaft 23, which also drives the charging pump 22. To steady the vertical shaft 150, the upper end thereof is journaled in a bearing 152 provided in the cover structure 134. Both the high-speed weights 146 are provided with inwardly extending fingers 153 engaging the bottom face of a sleeve 154 slidably mounted on the vertical shaft 150. The sleeve 154, at its upper end, carries a thrust bearing 155 against which a forked end 156 on the lever 140 bears.

The shaft 141 carrying the lever 140 extends to the exterior of the cover structure 134, and on the outer end thereof, there is provided a lever clamp 160 adjustably supporting a lever 161 in the form of a threaded rod (see Figs. 1, 3 and 14). On the free end of the lever 161 is attached a coil spring 162 with the spring anchored to the upper housing member 21 by means of an adjustable anchor 163. It will be obvious that the tension of the spring 162 opposes upward movement of the sleeve 154 on the vertical shaft 150 and consequently opposes outward movement of the low- and high-speed weights 145 and 146. However, the effect of the outward movement of these weights may be varied in several ways.

Thus, the tension of the spring 162 may be varied by adjustment of the anchor 163 and by adjusting the angular position of the lever clamp 160 on the rockshaft 141. The length of the lever 161 may also be varied to vary the effect of the spring in opposing the action of the weights. To change its effective length, the lever 161 is longitudinally movable in the lever bracket 160 and is held in place by locknuts 164, which with the lever 161 also serve to secure the lever clamp 160 on the rockshaft 141.

In operation, when the hand control lever 137 is set for idling speed, such setting also shifts the bell crank 131 to a predetermined position which consequently adjusts the tubular control member 124 to determine the amount of fuel that is to be bled off on each delivery stroke of the piston. Should the engine tend to exceed idling speed, the governor weights 145 and 146 move outwardly together as a unit in opposition to the spring 162 to raise the fingers 153 and thus elevate the sleeve 154. This in turn permits the tubular control member to rise to reduce the fuel supplied to the engine cylinders. If the hand lever 137 is moved to a position beyond its idle speed position, the engine is under manual control unless the engine tends to exceed a predetermined maximum. At this time, the low-speed weights 145 have moved outwardly until further movement thereof is restricted by an enclosing sleeve 165 mounted on the governor carrier 147. From that point the high-speed governor weights 146 move outwardly alone and, in this instance, the inwardly extending fingers 153 on the high-speed weights cause elevation of the sleeve 154 on the vertical shaft 150.

Vertical movement of the sleeve 154 causes the lever 140 on the rockshaft 141 to move clockwise, as shown in Fig. 2, thus swinging the lug 142 to the left. The spring 126 for elevating the tubular control member 124 raises this control member and swings the bell crank 131 counterclockwise until its arm 143 engages the lug 142. Elevation of the tubular control member 124 increases the amount of fuel bled off during the delivery stroke of the piston, since the lateral aperture 123 in the piston extension 121 is closed by passing over the end of the tubular control member 124 at a later point in the delivery stroke of the piston 64. Consequently, more of the fuel on such delivery stroke will be bled off through the tubular control member 124 and a smaller amount will thereby be placed under pressure by the piston to be forced through the valve 87 to the distributor and conducted to the engine cylinders.

Should the speed of the engine fall when the hand control lever 137 is at idling speed position, the governor weights 145 and 146 will not move outwardly as far, due to the tension of the spring 162. The sleeve 154 on the vertical shaft 150 of the governor will then be shifted to a lower position by the tension of the spring 162 acting through the lever 161, the rockshaft 141 and the lever 140. With this action, the lever 140 tends to swing in a counterclockwise direction, as illustrated in Fig. 2, and the lug 142 bearing against the arm 143 of the bell crank rotates the latter in a clockwise direction about the eccentric 133 to depress the tubular control member 124. Depression of the tubular control member 124 causes the lateral aperture 123 in the piston extension 121 to be closed at an earlier point in the delivery stroke of the piston 64, thus decreasing the amount of fuel bled off during such stroke and increasing the amount of fuel placed under pressure by the piston 64 and delivered to the engine cylinder through the distributor 30. A similar action by the high-speed weights 146 takes place when the hand lever 137 is set at maximum position and an increase in load occurs.

It will be obvious that adjustment of the hand lever 137 may be utilized to vary the position of the tubular control member 124. Thus, by swinging the hand control lever 137 in a direction to cause the eccentric 133 to rotate in a counterclockwise direction, as shown in Fig. 2, the arm 132 of the bell crank 131 will be raised to permit the tubular control member 124 to move to a higher position under the influence of its spring 126. This in turn means that the lateral aperture 123 in the piston extension 121 will be closed at a later point in the delivery stroke of the piston 164 so that more fuel is thereby bled off and a smaller amount of the fuel is delivered to the engine cylinder. Thus, the speed of the engine will be decreased by such adjustment. Movement of the hand control lever 137 in the opposite direction to turn the eccentric 133 in a clockwise direction, as shown in Fig. 2, will produce the opposite effect and decrease the amount of fuel bled off during the delivery stroke of the piston 64 to increase the amount of fuel going to the engine, and, consequently, the speed thereof.

The hand lever 137 is arranged so it may, of course, be manually moved through a range extending from a stop position, where no fuel will be delivered to the engine cylinders, to a maximum position, where the maximum quantity of fuel is delivered to the cylinders by the metering pump. However, when the hand lever is released, after movement toward either position, the construction is such that the hand lever will be automatically returned to its idle speed position. To this end, spring means are employed, which exert forces on the hand lever 137 in such a way that, whenever it is moved in either direction from its idle speed position, such a force acts to return it to idle position.

Figure 16:
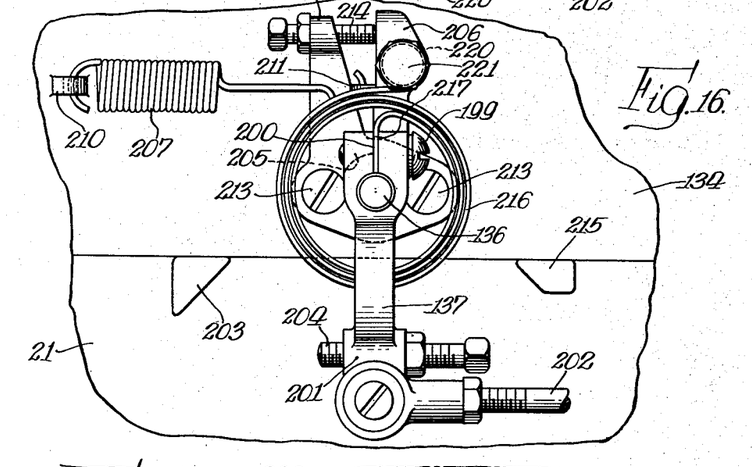
Fig. 16 is an elevational view of the manual control shown in Fig. 15.
Figure 17:
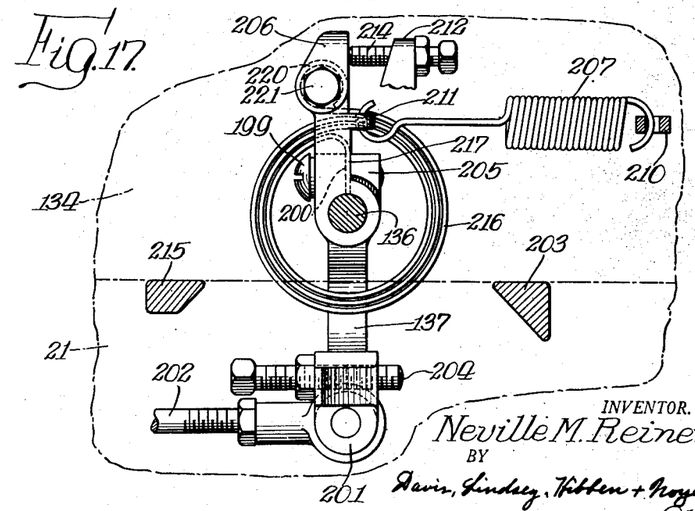
Fig. 17 is a vertical sectional view taken on the line 17—17 of Fig. 15.

As shown in Figs. 3, 15, 16 and 17 of the drawings, the hand lever 137 is slotted as at 200 at its upper end so that it may be clamped rigidly on the outer end 136 of the eccentric shaft 135 as by a screw 199. The lower end of the hand lever has a boss 201 to which is secured a rod 202 for manually actuating the hand lever. In the preferred arrangement, the hand lever stands in a vertical position as shown in Figs. 16 and 17, when in its idle position, and movement of the hand lever in a clockwise direction as shown in Fig. 16 is employed for increasing the quantity of fuel supplied to the engine cylinders. Such movement of the hand lever may extend to a maximum fuel position, beyond which further movement of the hand lever is prevented by a stop lug 203 formed on the side of the upper housing member 21 and adapted to be engaged by a stop screw 204 carried in the lower end of the hand lever 137. The stop screw 204, of course, provides for accurate adjustment of the maximum fuel position.

To automatically return the hand lever to idle position after having been moved toward the maximum fuel position, the upper end of the hand lever on its rear face and at one side of the slot 200 is provided with a lug 205 which, as the hand lever is turned clockwise, engages an idling control lever 206 rotatably mounted on the shaft end 136 to the rear of the hand lever. The idling control lever 206 thus moves with the hand lever as a unit when the two are turned in this direction. Upon release of the hand lever after such movement, a coiled spring 207, anchored at one end to a lug 210 formed on the cover structure 134 and hooked at its other end to a lug 211 formed on the idling control lever 206, draws the latter, and consequently the hand lever, in a counterclockwise direction as shown in Fig. 16. To limit such movement of the hand lever to idle position, a retainer 212 is mounted on the side of the cover structure 134, as by screws 213, and carries at its upper end a stop screw 214 constituting an abutment for the idling control lever 206 when the latter is in idle position. The screw 214, of course, provides adjustment so that the idle position of the lever 206 and the hand lever 137 may be accurately set.

When it is desired to stop the engine, the hand lever 137 is manually swung in a counterclockwise direction, as shown in Fig. 16, from its idle position. To limit movement of the hand lever in this direction, a stop lug 215 is provided on the side of the upper housing member 21. During this movement of the hand lever, the idling control lever 206 remains in its idle position as determined by the stop screw 214, since the lug 205 moves away from the lever 206.

Upon release of the hand lever after movement to its stop position, it is automatically returned to idle position by resilient means in the form of a spiral torsion spring 216. The latter is positioned substantially coaxially with the shaft end 136 and has its inner end bent as at 217 for clamping in the slot 200 in the upper end of the hand lever. The outer end of the spring 216 is looped as at 220 so that it may be secured to the idling control lever 206 as by a screw 221. Thus, when the hand lever is moved counterclockwise, the tension of the spring 216 is increased, and upon release of the hand lever, such tension automatically swings the hand lever back to its idle position. At the latter position, the lug 205 on the hand lever engages the idling control lever 206, which prevents further movement of the hand lever by the spring 216.

*Overspeed stop device*

The present fuel feeding apparatus is provided with an overspeed stop device adapted to shut off the supply of fuel to the engine when the latter operates at an excessive speed. The overspeed stop device is automatically operable to attain this result, and the supply of fuel to the engine, when once cut off by the device, can only be re-established by manually resetting the device.

In the preferred form of the device, a weight 170 (see Figs. 2, 4 and 14) is mounted in a radial position in an enlargement 171 on the main shaft extension 25 within the auxiliary housing member 34. The weight 170 is provided with a stem 172 extending through the enlargement 171, and a spring 173 is mounted within the enlargement and tends to prevent the weight 170 from moving radially outward relative to the enlargement 171. However, when an excessive speed is attained, centrifugal force moves the weight 170 outwardly beyond the enlargement 171 to engage an arm 174 of a bell crank 175. The other arm of the bell crank, indicated at 176, functions as a detent and is adapted to engage a shoulder 177 formed on the stem of the valve 57 controlling the flow of fuel delivered by the high-pressure gear pump 53 through the line 56 and to the line 60. A spring 180 tends to close the valve 57 to prevent flow of fuel therethrough, but the arm 176 of the bell crank 175, acting as a dentent, holds the valve 57 open under normal conditions.

Figure 4:
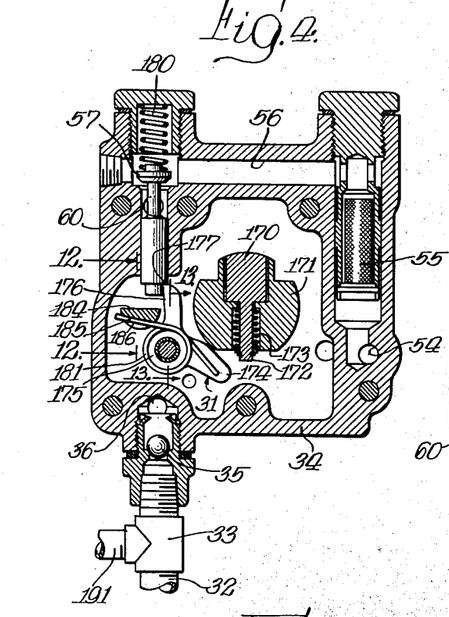
Fig. 4 is a transverse sectional view taken on the line 4—4 of Fig. 2.

When the main drive shaft 23 rotates at an excess speed, the weight 170 moves outwardly beyond the enlargement 171 to engage the arm 174 of the bell crank and thus swing it in a clockwise direction, as seen in Fig. 4, to shift the arm 176 out of engagement with the shoulder 177 on the stem of the valve 57. The spring 180 thereupon causes the valve 57 to close, to shut off the supply of fuel from the high-pressure gear pump 53 to the metering pump 27. On the pivotal support for the bell crank 75 is mounted a torsion spring 181, which tends to swing the bell crank in a counterclockwise direction, as seen in Fig. 4, so as to hold the arm 176 in engagement with the shoulder 177 on the stem of the valve 57. The weight 170 thus swings the bell crank in opposition to the torsion spring 181 so that, as soon as the engine has slowed down after closure of the valve 57, the torsion spring tends to swing the arm 176 back into a position to engage the shoulder 177. The valve, however, is closed at that time so that the arm 176 cannot re-engage the shoulder 177.

Re-engagement of the arm 176 with the shoulder 177 is effected manually by forcing the valve 57 to its open position against the pressure of the spring 180. To this end, a manual reset knob 182 located at the exterior of the auxiliary housing member 34, as shown in Figs. 1 and 12, is carried on a stub shaft 183 journaled in the auxiliary housing member 34. The shaft 183, at its inner end, is cut away to provide a substantially half round section 184 underlying the lower end of the stem of the valve 57. When the valve 57 is closed, the lower end of its stem is adjacent the flat side of the half round section 184, and by rotation of this half round section in a counterclockwise direction, as viewed in Fig. 4, by the reset knob 182, the half round section 184 functions as a cam to lift the valve 57 to its open position. When the valve 57 is raised sufficiently, the torsion spring 181 causes the arm 176 to re-engage the shoulder 177 on the valve stem and thus hold the valve in an open position. To hold the half round section 184 in position for resetting the valve, the end 185 of the torsion spring engages in a notch 186 in the stub shaft 183 and tends to hold the half round section 184 in the position shown in Fig. 4. Thus, when the reset knob 182 is turned to open the valve 57, the knob is immediately returned to its original position, after release from the hand, by the action of the end 185 of the torsion spring 181.

The overspeed stop device thus functions, when the engine attains an excessive speed, to shut off the flow of fuel from the high-pressure gear pump 53 to the fuel metering pump 27 so that no more fuel can flow to the engine cylinders until the reset knob 182 has been actuated to open the valve 57. During such time as the valve 57 is closed and the engine is still turning over, the fuel delivered by the gear pump 53 is built up in pressure until the pressure relief valve 62 is opened in the by-pass 61 so that any fuel still being delivered by the high-pressure gear pump 53 is spilled back into the float chamber 46, from which the pump 53 draws its supply.

For priming the engine in starting it, a manually operated priming pump 190 (see Fig. 14) is provided. This pump may be located at some convenient position, and in case the engine is used in a motor truck, the priming pump 190 is usually mounted on the dash of the truck. The priming pump 190 is provided with a line 191 adapted to draw fuel from the fuel supply tank 26. In the preferred arrangement, the line 191 is connected to the T fitting 33 through which the low-pressure gear pump 40 draws its supply of fuel. The fuel discharged by the priming pump 190 is carried through a discharge line 192 connected to a pressure-operated valve 193 (see Figs. 2 and 14) mounted centrally in the stationary distributor disc 91. When the priming pump builds up sufficient pressure, the valve 193 opens to permit the fuel to flow into the central chamber 92 in the stationary disc 91, and from there the fuel fills the radial passage 96 in the rotary disc member 94 and the passages to the various injectors for the cylinders.

The fuel pumped into the central chamber 92 in the stationary distributor disc 91 also works backwardly through the passages 90 and 86 toward the metering pump 27. The fuel, however, cannot pass through the valve 87 since the spring of this valve holds it closed. To prime the metering pump, a branch passage 194 (see Figs. 11 and 14) extends from the passage 86. A manually operable priming valve 195 controls the flow through the passage 194 and, when opened, permits flow from the branch passage 194 into another passage 196 in the lower housing member 20, connected to the passage 71 through which the high pressure charging pump 53 normally circulates fuel. The passage 71, as heretofore stated, communicates with the intake ports 65 of the fuel metering pump so that fuel may be forced into the cylinder of the metering pump when the piston 64 opens the intake ports 65. Fuel may also pass to the line 60 leading from the high-pressure gear pump 53.

I claim:

1. A fuel feeding apparatus for an internal combustion engine of the piston and cylinder type, comprising a piston and cylinder type metering pump for delivering metered quantities of fuel to the engine cylinders with the cylinder of the pump extending vertically and providing a pump chamber therein above the piston, said pump chamber having an intake port at its lower part, a bleed port at its top and a delivery port intermediate its ends, said intake and bleed ports being open during the initial portion of each delivery stroke of the piston, with the movement of the piston on the delivery stroke being adapted to close the intake port first and thereafter the bleed port, means for delivering fuel under pressure to said intake port, and a pressure-operated check valve in said delivery port to cause air in the pump to pass out through the bleed port as the fuel enters the intake port and to prevent its being forced through the delivery port.

2. A fuel feeding apparatus for an internal combustion engine, comprising a piston and cylinder type metering pump for delivering metered quantities of fuel to the engine cylinders with the pump cylinder extending vertically and providing a pump chamber therein above the piston, said pump chamber having an intake port at its lower part, a bleed port at its top and a delivery port intermediate its ends, with the intake and bleed ports adapted to be opened and closed by movement of the piston, said bleed port being open when the intake port is open, a charging pump having a discharge line through which the charging pump continuously discharges fuel, said discharge line having a connection with said intake port whereby a portion of the continuously discharged fuel is diverted into and rapidly fills the metering pump to force air therein through said bleed port, and a pressure-operated check valve in said delivery port adapted to remain closed until both the intake port and the bleed port are closed and the pressure of the fuel in the pump chamber is increased.

3. In a fuel feeding apparatus for an internal combustion engine, a variable delivery fuel metering pump comprising a cylinder and constant stroke piston having a tubular extension of reduced diameter with a transverse bleed port therein, and an adjustably mounted sleeve extending into said extension and providing a bleed passage, said bleed port providing communication from the cylinder to said bleed passage when the bleed port is beyond the end of said sleeve and being adapted to be closed by said sleeve upon movement of the piston when the port passes over the end of the sleeve.

4. In a fuel feeding apparatus for an internal combustion engine, a variable delivery fuel metering pump comprising a cylinder casing having laterally opening intake and delivery ports and a reduced bore extending through one end, and a piston mounted in said cylinder and having a tubular extension of reduced diameter slidably mounted in said bore, said extension having a laterally opening bleed port adjacent its inner end, and an adjustable sleeve slidably mounted in said extension and providing an axially extending bleed passage, said bleed port permitting flow of fuel from said cylinder into said bleed passage when the bleed port is beyond the end of said sleeve and being adapted to be closed upon movement of the piston when the bleed port passes over the end of said sleeve.

5. In a fuel feeding apparatus for an internal combustion engine, a variable delivery fuel metering pump comprising a cylinder casing having laterally opening intake and delivery ports and a reduced bore extending through one end, and a piston mounted in said cylinder and having a tubular extension of reduced diameter slidably mounted in said bore, said extension having a laterally opening bleed port adjacent its inner end, an adjustably mounted sleeve extending into said extension and providing a bleed passage therethrough, and a pressure-operated valve in said delivery port whereby on the delivery stroke of said piston fuel is forced through said bleed port into said bleed passage when the bleed port is beyond the end of said sleeve, and when the bleed port passes over the end of said sleeve, pressure is built up within the cylinder to open said valve.

6. In a fuel feeding apparatus for an internal combustion engine, a variable delivery fuel metering pump comprising a cylinder casing having laterally opening intake and delivery ports and a reduced bore extending through one end, and a piston mounted in said cylinder and having a tubular extension of reduced diameter slidably mounted in said bore, said extension having a laterally opening bleed port adjacent its inner end, and an adjustably mounted sleeve slidably mounted in said extension and providing an axially extending bleed passage, said bleed port permitting flow of fuel from said cylinder into said bleed passage when the bleed port is beyond the end of said sleeve and being adapted to be closed upon movement of the piston when the bleed port passes over the end of said sleeve, and control linkage for adjusting the position of said sleeve to vary the quantity of fuel discharged through said bleed passage during each delivery stroke of the piston.

7. In a fuel feeding apparatus for an internal combustion engine having a fuel metering pump for delivering metered quantities of fuel to the engine cylinders including an adjustable element for varying the quantities of fuel, a control linkage comprising a shiftable member adapted to engage said element, a rotatably mounted shaft for shifting said member, and a manual control comprising a hand lever secured to said shaft and movable through a range from a stop position to a maximum speed position, an idling control lever rotatably mounted on said shaft, said hand lever having a lug engaging said idling control lever to swing the latter when said hand lever is moved toward maximum speed position, a spring tending to swing said idling control lever toward idle speed position and by said lug to swing said hand lever to the same position, said hand lever being movable to stop position without moving said idling speed lever, and a second spring connecting said levers and tending to swing the hand lever from stop position to idle speed position.

8. In a fuel feeding apparatus for an internal combustion engine having a fuel metering pump for delivering metered quantities of fuel to the engine cylinders including an adjustable element for varying the quantities of fuel, a control linkage comprising a shiftable member adapted to engage said element, a rotatably mounted shaft for shifting said member, and a manual control comprising a hand lever secured to said shaft and movable through a range from a stop position to a maximum speed position, an idling control lever rotatably mounted on said shaft said lever interengaging to move as a unit when the hand lever is moved from an idle speed position toward the maximum speed position, a spring connected to said idling control lever and tending to move both levers to idle speed position, said hand lever being movable relative to said idling control lever from idle speed position to stop position, and a second spring tending to return said hand lever from stop position to idle speed position.

9. In a fuel feeding apparatus for an internal combustion engine having a fuel metering pump for delivering metered quantities of fuel to the engine cylinders including an adjustable element for varying the quantities of fuel, a control linkage comprising a shiftable member adapted to engage said element, a rotatably mounted shaft for shifting said member, and a manual control comprising a hand lever secured to said shaft and movable through a range from a stop position to a maximum speed position and means tending to move said hand lever to an idle speed position when moved either toward the maximum speed position or the stop position comprising a spring-operated lever engaging said hand lever when the latter is moved from idle speed position toward maximum speed position and tending to return said hand lever to idle speed position, said spring-operated lever also having a resilient connection with said hand lever tending to return said hand lever to idle speed position when the latter is moved to stop position.

10. In a fuel feeding apparatus for an internal combustion engine having a fuel metering pump for delivering metered quantities of fuel to the engine cylinders including an adjustable element for varying the quantities of fuel, a control linkage comprising a shiftable member engaging said element, a rotatably mounted shaft for shifting said member, and a manual control comprising a hand lever secured to said shaft and movable through a range from a stop position to a maximum speed position and means tending to move said hand lever to an idle speed position when moved either toward the maximum speed position or the stop position comprising a spring-operated lever for moving said hand lever to idle position when the latter is moved in one direction therefrom and resiliently connected to said hand lever for moving said hand lever to idle position when the latter is moved in the opposite direction.

NEVILLE M. REINERS.

References Cited in the file of this patent

UNITED STATES PATENTS

| Number | Name | Date |
| --- | --- | --- |
| 1,757,353 | Barnard | May 6, 1930 |
| 1,802,043 | Bjorkgren | Apr. 21, 1931 |
| 1,886,067 | Moses | Nov. 1, 1932 |
| 2,020,302 | Deschamps | Nov. 12, 1935 |
| 2,206,914 | Muller | July 9, 1940 |
| 2,222,919 | Trapp | Nov. 26, 1940 |
| 2,223,759 | Dillstrom | Dec. 3, 1940 |
| 2,251,783 | Davis | Aug. 5, 1941 |
| 2,282,562 | Cole | May 12, 1942 |
| 2,313,264 | Reggio | Mar. 9, 1943 |
| 2,353,188 | Roosa | July 11, 1944 |
| 2,365,412 | Janes | Dec. 19, 1944 |
| 2,372,559 | Edwards | Mar. 27, 1945 |
| 2,473,412 | Bryant | June 14, 1949 |